Aug. 26, 1952 A. J. MARBEUF 2,608,433
TONGS FOR TEST TUBES OR THE LIKE
Filed Aug. 11, 1947

INVENTOR:
Armand Jean Marbeuf
BY
Richards & Geier
ATTORNEYS

Patented Aug. 26, 1952

2,608,433

UNITED STATES PATENT OFFICE 2,608,433

TONGS FOR TEST TUBES OR THE LIKE

Armand Jean Marbeuf, Rabat, Morocco

Application August 11, 1947, Serial No. 767,964
In France June 6, 1945

Section 1, Public Law 690, August 8, 1946
Patent expires June 6, 1965

5 Claims. (Cl. 294—99)

The present invention is concerned with a tongs device for test tubes, matrasses, and the like.

Said device is essentially characterised in that a pair of resilient strip elements forming the tongs are normally maintained in contact engagement, their action being reinforced by means of arcuate spring plates; the resilient strips may be separated apart from each other by the action of a thumb lever interposed between the arms of the tongs and operable with the thumb of the operator.

The resilient strip elements and the springs are secured to a handle made of heat insulating material, the free ends of the strips being provided with unequally formed V-shaped jaws facing each other.

The above described device offers, as compared with the conventional devices used in laboratories, the advantage of avoiding the necessity of maintaining both arms of the tongs clamped by a manually exerted stress which with time may become tiring.

To clearly state the nature of the invention, one specific embodiment thereof is described hereinafter merely by way of example and reference being had to the accompanying drawings, any features of the invention which may appear both from the drawings and the disclosure, forming of course part of the invention.

Figure 1:
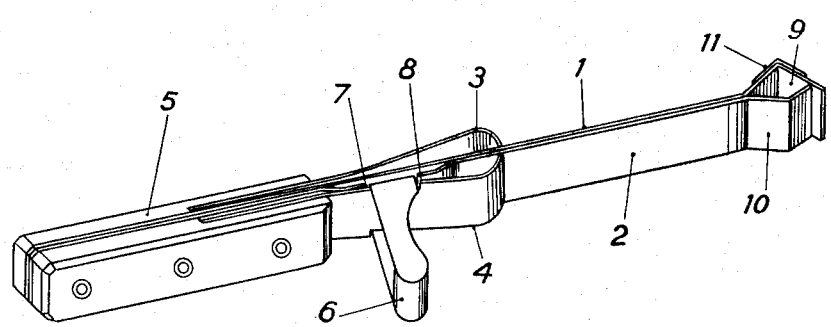
Fig. 1 illustrates in perspective my improved tongs in inoperative condition.
Figure 2:
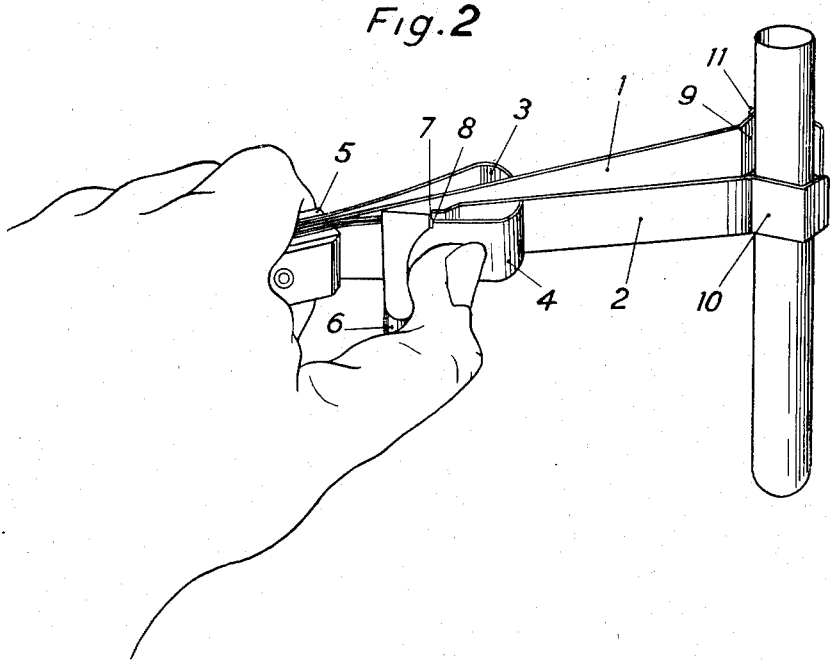
Fig. 2 illustrates the tongs as used in holding a test tube.

Referring to the drawings, 1 and 2 indicate the pair of resilient strip elements, forming the arms of the tongs, 3 and 4 are the spring plates, 5 is the handle and 6 is the thumb-lever which is maintained in its normal position by means of notches 7 and 8 respectively formed in the strip 2 and the spring 4; 9 and 10 are the free ends of the strips adapted to form jaws; the bent end 9, is stiffened with an element 11.

Operation of the device will clearly appear from a study of the drawing; the thumb lever when actuated acts upon the strip element 2 which is moved away from strip element 1; thereby enabling a test tube or the like to be inserted between both jaws of the tongs. The article thus inserted is retained by the action of the springs and the shape of the free ends of the arms of the tongs formed as jaws.

Obviously without exceeding the scope of the invention, alterations may be made therein, provided the essential spirit thereof is not affected, and any suitable materials may be employed in its construction.

Thus, the plate elements and the springs may be made of chromium steel, although other suitably resilient material could be utilized for that purpose.

What is claimed is:

1. A device for handling an article to be heated comprising in combination a handle of heat isolating material, a pair of elongated arms interconnected together and with said handle at one end of said arms, spring means to normally urge the free ends of said arms together, means at said free ends of said arms defining a pair of tongs adapted to clamp said article therebetween in said normal spring-urged condition of said arms, and means operable by a finger of the user to force said arms apart against said spring action.

2. A device for handling a chemical laboratory container comprising in combination a handle of heat-isolating material, a pair of resilient elongated juxtaposed strips rigidly interconnected at one end thereof together and with said handle, so as to be normally in engagement substantially throughout their length, a pair of spring-plates having one end rigidly secured to said handle and to said secured ends of said strips on the outer sides thereof and each having an inturned projection engaging an intermediate point of each of said strips to positively spring-urge said strips into clamped condition, means at the free ends of said strips adapted to clamp said container therebetween in said clamped condition of said strips, and means operable by a finger of the user to force one of said strips with its related spring away from the other one.

3. A device for handling a chemical laboratory container comprising in combination a handle of heat-isolating material, a pair of juxtaposed resilient strips rigidly secured to said handle in normally juxtaposed relation at one end thereof, a pair of spring-plates having one end thereof rigidly secured to said handle and to the adjacent ends of said strips and having an inturned opposite end engaging an intermediate point of said strips to urge said strips to said normal juxtaposed relationship, means at the free ends of said strips defining clamping means therebetween, and a thumb-operable projecting lever having a part accommodated between said strips adjacent to said handle normally lying in the plane of said strips and adapted as said lever is operated to assume a position outside of said plane to forcibly cam said strips apart.

4. A device for handling a chemical laboratory container comprising in combination a handle of heat-isolating material, a pair of juxtaposed resilient strips rigid with said handle at one end of said strips, a pair of spring-plates on the outersides of said strips urging said strips to juxtaposed position, each of said strips at the free end thereof being bent to the form of an inwardly opening V of a different angle, both of said V's being adapted to clamp said container therebetween, and thumb-operable means to force said strips apart against the action of said springs to unclamp said container.

5. A device for handling a chemistry appliance comprising in combination a handle of heat-isolating material, a pair of normally juxtaposed resilient strips rigid with said handle at one end of said strips, a pair of spring-plates on the outer sides of said strips having one end secured to said handle and the opposite end inturned to engage an intermediate point of said strips, a recess formed in one of said strips and the related spring, a thumb-operable projecting lever having a part accommodated in said recesses and operable to cam said strips apart and clamping means at the free ends of said strips.

ARMAND JEAN MARBEUF.

REFERENCES CITED

The following references are of record in the file of this patent:

UNITED STATES PATENTS

| Number | Name | Date |
| --- | --- | --- |
| 210,849 | Goss | Dec. 17, 1878 |
| 970,938 | Mickey | Sept. 20, 1910 |
| 1,751,181 | Williams | Mar. 18, 1930 |

FOREIGN PATENTS

| Number | Country | Date |
| --- | --- | --- |
| 122,024 | Switzerland | Aug. 16, 1927 |